US012785093B2

(12) United States Patent
Kim et al.

(10) Patent No.: US 12,785,093 B2
(45) Date of Patent: Nov. 3, 2026

(54) CATHODE COMPRISING MIXTURE LAYER HAVING DUAL LAYER STRUCTURE WITH DIFFERENT LNO AMOUNTS, AND SECONDARY BATTERY COMPRISING SAME

(71) Applicant: LG CHEM, LTD., Seoul (KR)

(72) Inventors: Il Hong Kim, Daejeon (KR); Byoung Hyo Jung, Daejeon (KR); Sung Chul Lim, Daejeon (KR); Min Chul Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 933 days.

(21) Appl. No.: 17/296,512

(22) PCT Filed: Oct. 30, 2020

(86) PCT No.: PCT/KR2020/015011

§ 371 (c)(1),
(2) Date: May 24, 2021

(87) PCT Pub. No.: WO2021/091168

PCT Pub. Date: May 14, 2021

(65) Prior Publication Data

US 2022/0006083 A1 Jan. 6, 2022

(30) Foreign Application Priority Data

Nov. 7, 2019 (KR) ........................ 10-2019-0141609
Oct. 22, 2020 (KR) ........................ 10-2020-0137409

(51) Int. Cl.
*H01M 4/52* (2010.01)
*H01M 4/36* (2006.01)
(Continued)

(52) U.S. Cl.
CPC ........... *H01M 4/525* (2013.01); *H01M 4/364* (2013.01); *H01M 4/366* (2013.01); *H01M 4/386* (2013.01);
(Continued)

(58) Field of Classification Search
None
See application file for complete search history.

(56) References Cited

U.S. PATENT DOCUMENTS 5,759,719 A 6/1998 Mao
2006/0099495 A1 5/2006 Suzuki et al.
(Continued)

FOREIGN PATENT DOCUMENTS

CN 1964101 * 5/2007 ............ H01M 10/05
CN 1964101 A 5/2007
(Continued)

OTHER PUBLICATIONS

Extended European Search Report dated Mar. 31, 2022 issued by the European Patent Office in a corresponding European patent application No. 20885843.1.
(Continued)

*Primary Examiner* — Barbara L Gilliam
*Assistant Examiner* — Angela J Mertin
(74) *Attorney, Agent, or Firm* — Morgan, Lewis & Bockius LLP

(57) ABSTRACT

The present invention relates to a cathode comprising a mixture layer having a dual layer structure with different LNO amounts, and a secondary battery comprising same, the cathode enabling battery performance to increase while preventing battery cell stability from degrading.

20 Claims, 1 Drawing Sheet

(51) Int. Cl.

| | |
|---|---|
| ***H01M 4/38*** | (2006.01) |
| ***H01M 4/50*** | (2010.01) |
| ***H01M 4/505*** | (2010.01) |
| ***H01M 4/525*** | (2010.01) |
| ***H01M 4/58*** | (2010.01) |
| ***H01M 4/583*** | (2010.01) |
| *H01M 4/02* | (2006.01) |

(52) U.S. Cl.
CPC ........... *H01M 4/505* (2013.01); *H01M 4/583* (2013.01); *H01M 2004/028* (2013.01); *H01M 2220/30* (2013.01)

(56) References Cited

U.S. PATENT DOCUMENTS

| | | | |
|---|---|---|---|
| 2012/0094177 | A1 | 4/2012 | Honoki et al. |
| 2015/0255786 | A1 | 9/2015 | Hashimoto et al. |

FOREIGN PATENT DOCUMENTS

| | | | | |
|---|---|---|---|---|
| CN | 108933242 A | | 12/2018 | |
| JP | H09-147858 A | | 6/1997 | |
| JP | 2003-197180 A | | 7/2003 | |
| JP | 2003197180 | * | 7/2003 | ............ H01M 10/05 |
| JP | 2006-134770 A | | 5/2006 | |
| JP | 2007-179864 A | | 7/2007 | |
| JP | 2010-251047 A | | 11/2010 | |
| JP | 2015-138730 A | | 7/2015 | |
| JP | 2016-219181 A | | 12/2016 | |
| JP | 2018-147790 A | | 9/2018 | |
| KR | 10-2000-0067311 A | | 11/2000 | |
| KR | 10-2015-0049999 A | | 5/2015 | |
| KR | 10-2017-0142024 A | | 12/2017 | |
| KR | 10-2018-0000697 A | | 1/2018 | |
| KR | 10-2019-0065147 A | | 6/2019 | |

OTHER PUBLICATIONS

International Search Report (with partial translation) dated Feb. 3, 2021 issued in corresponding International Patent Application No. PCT/KR2020/015011.

Office Action issued in corresponding Chinese Patent Application No. 202080006454.3, dated Aug. 12, 2023.

* cited by examiner

100
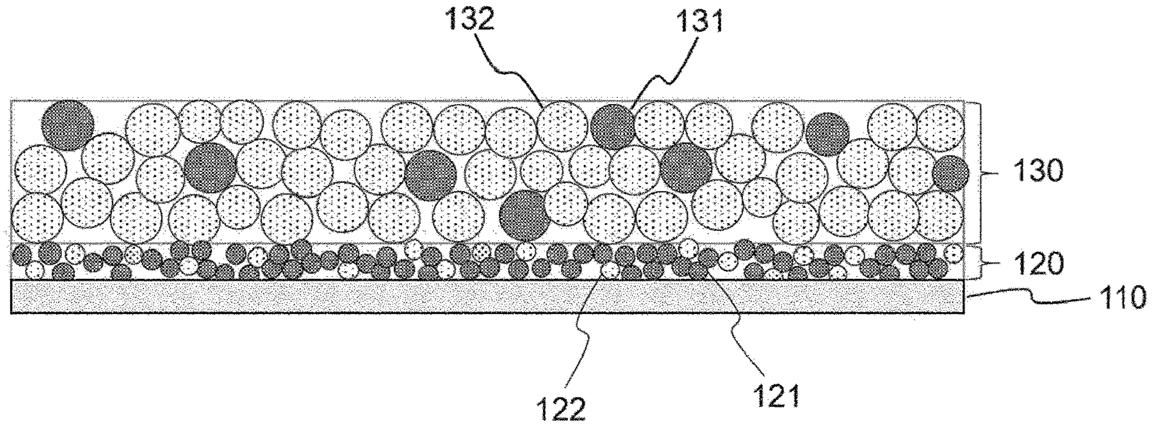

CATHODE COMPRISING MIXTURE LAYER HAVING DUAL LAYER STRUCTURE WITH DIFFERENT LNO AMOUNTS, AND SECONDARY BATTERY COMPRISING SAME

TECHNICAL FIELD

The present invention relates to a positive electrode including a mixture layer having a double-layer structure having a different LNO content, and a secondary battery including the same.

This application claims the benefit of priority based on Korean Patent Application No. 10-2019-0141609 filed on Nov. 7, 2019 and Korean Patent Application No. 10-2020-0137409 filed on Oct. 22, 2020, and the content of these Korean Patent Applications are incorporated herein as part of the present specification.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

The development of an electrode having a high energy density is attracting attention as a way to increase the output characteristics of a secondary battery. For example, in the case of a positive electrode, research on a high-content nickel (High-Ni)-based NCM positive electrode active material having a high energy density has been continued. However, a secondary battery to which a high content nickel (High-Ni) NCM positive electrode active material is applied has poor stability of a battery cell and is particularly vulnerable to an exothermic reaction due to an internal short circuit.

In the case of the negative electrode, research on a silicon-based active material having a high energy density has been continued. However, the negative electrode to which the silicon-based active material is applied has a large volume change during the charging and discharging process, which causes the stability of the battery to be impaired. In particular, the negative electrode including the silicon-based active material has a problem in that the energy density of the battery cell decreases because the initial charge/discharge efficiency is low. To compensate for this, LNO can be applied to the positive electrode as an active material. However, when LNO is applied to the positive electrode, gas is generated under high voltage or high temperature conditions, and the performance of the battery cell is deteriorated due to elution of the transition metal.

Accordingly, there is a need to develop an electrode having a new structure capable of enhancing the performance of the battery without impairing the stability of the battery cell.

DISCLOSURE

Technical Problem

The present invention was invented to solve the above problems, and an object of the present invention is to provide an electrode having a mixture layer having a double-layer structure having a different LNO content and a secondary battery including the same.

Technical Solution

The positive electrode for a secondary battery according to the present invention includes: a current collector layer; a lower mixture layer formed on one or both surfaces of the current collector layer; and an upper mixture layer formed on a surface opposite to a surface in which the lower mixture layer contacts the current collector layer. In addition, based on 100 parts by weight of the total active material contained in the lower mixture layer, the content of LNO ($Li_xN_iO_2$ ($1.1 \leq x \leq 2.5$)) is 60 parts by weight or more, and based on 100 parts by weight of the total active material contained in the upper mixture layer, the content of LNO is in the range of 1 to 40 parts by weight.

In one example, the lower and upper mixture layers include a first active material and a second active material. Here, the first active material is LNO ($Li_xN_iO_2$ (1.1$_i$Âx$_i$Â2.5)). The second active material is one or more selected from the group consisting of $Li_xCoO_2$(0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$(0.5<x<1.3, 0<y<1), $Li_xCo_{1-y}Mn_yO_2$ (0.5<x<1.3, 0$_i$Ây<1), $Li_xNi_{1-y}Mn_yO_2$(0.5<x<1.3, O$_i$Ây<1), $Li_x(Ni_aCo_bMn_c)O_4$(0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$ (0.5<x<1.3, 0<z<2), $Li_xCoPO_4$(0.5<x<1.3) and $Li_xFePO_4$ (0.5<x<1.3).

In another example, the ratio $((L_{TOP})/(L_{UND})$ of the LNO fraction ($L_{TOP}$, wt %) of the active material in the upper mixture layer to the LNO fraction ($L_{UND}$, wt %) of the active material contained in the lower mixture layer $((L_{TOP})/(L_{UND}))$ is 0.5 or less.

In one specific example, among the active materials contained in the lower mixture layer, the content ratio of the first active material and the second active material is 65 to 98:2 to 35 (weight ratio), and among the active materials contained in the upper mixture layer, the content ratio of the first active material and the second active material is 2 to 35:65 to 98 (weight ratio).

In one example, the average particle diameter of the active material contained in the lower mixture layer is in the range of 1 to 10 μm, and the average particle diameter of the active material contained in the upper mixture layer is in the range of 15 to 60 μm.

In another example, the average thickness ratio of the lower mixture layer and the upper mixture layer is in the range of 1:9 to 3:7.

In a specific example, in the positive electrode for the secondary battery, a ratio $((B_{TOP})/(B_{UND}))$ of a binder content ($B_{TOP}$, wt %) contained in the upper mixture layer to a binder content ($B_{UND}$, wt %)) contained in the lower mixture layer is in a range of 0.1 to 0.95.

In addition, the present invention provides a secondary battery including the positive electrode described above. In one example, a secondary battery according to the present invention includes a positive electrode, a negative electrode, and a separator interposed between the positive electrode and the negative electrode, and the positive electrode is as described above.

In one example, the negative electrode includes: a current collector layer; and a negative electrode mixture layer formed on one or both surfaces of the current collector layer and including a negative electrode active material, and the negative electrode active material includes a silicon (Si)-based active material.

In further another example, the negative electrode includes: a current collector layer; and a negative electrode mixture layer formed on one or both surfaces of the current collector layer and including a negative electrode active material, and the negative electrode active material includes a carbon-based active material and a silicon-based active material.

In a specific example, in the negative electrode active material, the content ratio of the carbon-based active material and the silicon-based active material is in the range of 10 to 95:5 to 90 by weight. In addition, the present invention provides a device including the secondary battery described above. In one example, the device is at least one of a mobile device, a wearable device, a laptop computer, and an automobile.

Advantageous Effects

The positive electrode for a secondary battery according to the present invention can increase battery performance at the same time without impairing the stability of the battery cell.

BRIEF DESCRIPTION OF THE DRAWINGS

FIG. 1 is a schematic diagram showing a cross-sectional structure of a positive electrode for a secondary battery manufactured according to the present embodiment.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The positive electrode for a secondary battery according to the present invention includes: a current collector layer; a lower mixture layer formed on one or both surfaces of the current collector layer; and an upper mixture layer formed on a surface opposite to a surface in which the lower mixture layer contacts the current collector layer. In addition, based on 100 parts by weight of the total active material contained in the lower mixture layer, the content of LNO ($Li_xNiO_2$ ($1.1<x<2.5$)) is 60 parts by weight or more, and based on 100 parts by weight of the total active material contained in the upper mixture layer, the content of LNO is in the range of 1 to 40 parts by weight.

The positive electrode for a secondary battery according to the present invention includes a positive electrode mixture layer having a double layer structure. In this case, the lower and upper mixture layers forming the positive electrode mixture layer of the double-layer structure include LNO, and the content of LNO for each layer is set differently. In the present invention, LNO is applied to the positive electrode to the positive electrode having a double-layer structure mixture layer, and the content of LNO is set differently for each layer. As a result, it is possible to minimize the performance degradation of the battery cell due to LNO mixing.

In one embodiment, based on 100 parts by weight of the total active material contained in the lower mixture layer, the content of LNO ($Li_xNiO_2$) is the range of 60 to 100 parts by weight, 70 to 100 parts by weight, 80 to 100 parts by weight, 60 to 98 parts by weight , 65 to 95 parts by weight, 70 to 95 parts by weight, 70 to 98 parts by weight, 65 to 80 parts by weight, 70 to 85 parts by weight, 85 to 98 parts by weight, 65 to 85 parts by weight, 80 to 95 parts by weight, or 65 to 95 parts by weight. In the present invention, the active material contained in the lower mixture layer is formed of only LNO or has a relatively high content of LNO. In the lower mixture layer, the content of LNO is controlled to a high level in order to increase the stability of the battery, and in particular, the content of LNO is controlled within the above range in order to solve problems that occur when a negative electrode containing a silicon-based active material is used.

In another embodiment, based on the total 100 parts by weight of the active material contained in the upper mixture layer, the content of LNO is 1 to 40 parts by weight, 2 to 35 parts by weight, 5 to 30 parts by weight, 2 to 10 parts by weight , 8 to 15 parts by weight, 15 to 35 parts by weight, 2 to 20 parts by weight, or 5 to 15 parts by weight. In the present invention, the active material contained in the upper mixture layer has a relatively low LNO content. If the content of LNO in the upper mixture layer is too high, the capacity and performance of the battery may be deteriorated.

In one embodiment, the lower and upper mixture layers include a first active material and a second active material.

Here, the first active material is LNO. In a specific embodiment, the LNO has a structural formula of $Li_xNiO_2$. Here, the xis in the range of 1.1 to 2.5, 1.5 to 2, 2 to 2.5, or 1.8 to 2.3. For example, the x is 2.

In addition, as the second active material, various positive electrode active materials other than LNO can be applied. For example, the second active material is one or more selected from the group consisting of $Li_xCoO_2$(0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$(0.5<x<1.3, 0<y<1), $Li_xCo_{1-y}Mn_yO_2$ (0.5<x<1.3, $O_i$Ây<1), $Li_xNi_{1-y}Mn_yO_2$(0.5<x<1.3, $O_i$Ây<1), $Li_x(Ni_aCo_bMn_c)O_4$(0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$ (0.5<x<1.3, 0<z<2), $Li_xCoPO_4$(0.5<x<1.3) and $Li_xFePO_4$ (0.5<x<1.3).

In another embodiment, the ratio (($L_{TOP}$)/($L_{UND}$) of the LNO fraction ($L_{TOP}$, wt %) of the active material in the upper mixture layer to the LNO fraction ($L_{UND}$, wt %) of the active material contained in the lower mixture layer ($L_{TOP}$)/($L_{UND}$)) is 0.5 or less. Specifically, the ratio ($L_{TOP}$)/($L_{UND}$)) of the fraction of LNO per layer ($L_{TOP}$, wt %) is in the range of 0.01 to 0.5, 0.01 to 0.3, 0.05 to 0.3, 0.05 to 0.2, 0.02 to 0.5, or 0.05 to 0.5. The LNO fraction is obtained by converting the content (wt %) of LNO contained in the lower mixture layer and the LNO content (wt %) contained in the upper mixture layer, respectively, and then calculating the ratio.

In a specific embodiment, among the active materials contained in the lower mixture layer, the content ratio of the first active material and the second active material is 65 to 98:2 to 35 (weight ratio), and among the active materials contained in the upper mixture layer, the content ratio of the first active material and the second active material is 2 to 35:65 to 98 (weight ratio). Specifically, among the active materials contained in the lower mixture layer, the content ratio of the first active material and the second active material is 65 to 95:5 to 35 (weight ratio), and among the active materials contained in the upper mixture layer, the content ratio of the first active material and the second active material is 5 to 30:70 to 95 (weight ratio).

In one embodiment, the average particle diameter of the active material contained in the lower mixture layer is in the range of 1 to 10 μm, and the average particle diameter of the active material contained in the upper mixture layer is in the range of 15 to 60 μm. Specifically, the average particle diameter of the active material contained in the lower mixture layer is in the range of 3 to 8 μm, and the average particle diameter of the active material contained in the upper mixture layer is in the range of 15 to 40 μm.

In the present invention, by disposing an active material having a small particle diameter in the lower mixture layer, there is an effect of increasing the capacity of a battery by applying a small particle active material having a large specific surface area. The lower mixture layer also serves as a buffer layer to prevent damage to the current collector by the large particle active material contained in the upper mixture layer when the mixture layer is pressed during the electrode manufacturing process. In addition, by disposing an active material having a large particle diameter in the upper mixture layer, there is an effect of enhancing the stability of the battery and supplementing the mechanical strength. Furthermore, relatively large pores are formed between the large particle active materials, and these pores induce smooth flow of the electrolyte solution.

In yet another embodiment, the ratio of the average thickness of the lower mixture layer and the upper mixture layer is in the range of 1:9 to 3:7, specifically in the range of 1:9 to 2:8. In the present invention, the thickness of the lower mixture layer is controlled to be relatively small. Through this, while maintaining the effect of applying LNO as an electrode active material, it is possible to minimize the decrease in physical properties of the battery. In addition, when the particle diameter of the active material of the lower mixture layer is controlled to be small, the impregnation rate of the electrolyte solution is slow due to the small pore size, and the flow rate or ion conductivity of the electrolyte solution is low. Accordingly, the lower mixture layer is formed thin, but the upper mixture layer is formed relatively thick, so that excellent ion conductivity can be realized.

The ratio $((B_{TOP})/(B_{UND}))$ of the binder content ($B_{TOP}$, wt %) contained in the upper mixture layer to the binder content ($B_{UND}$, wt %)) contained in another lower mixture layer is in the range of 0.1 to 0.95. In the present invention, the binder content of the lower mixture layer is maintained high, and the binder content of the lower mixture layer is controlled to be relatively low. In the present invention, in order to increase the bonding force between the mixture layer and the current collector, the content of the binder is kept high in the lower mixture layer. However, when the content of the binder increases, the content of the conductive material in the mixture layer should be increased, and the capacity of the battery decreases as the content of the active material decreases. Therefore, only a small amount of binder is applied to the upper mixture layer.

In addition, the present invention provides a secondary battery including the electrode described above. Specifically, the secondary battery includes a positive electrode, a negative electrode, and a separator interposed between the positive electrode and the negative electrode, and the positive electrode is as described above. For example, the secondary battery is a lithium secondary battery. Specifically, the lithium secondary battery may include, for example, an electrode assembly described above; a non-aqueous electrolyte solution impregnating the electrode assembly; and a battery case containing the electrode assembly and the non-aqueous electrolyte solution.

For example, the positive electrode includes: a current collector layer; a lower mixture layer formed on one or both surfaces of the current collector layer; and an upper mixture layer formed on a surface opposite to a surface in which the lower mixture layer contacts the current collector layer, and based on 100 parts by weight of the total active material contained in the lower mixture layer, the content of LNO ($Li_xNiO_2$ ($1.1<x<2.5$)) is 60 parts by weight or more, and based on 100 parts by weight of the total active material contained in the upper mixture layer, the content of LNO is in the range of 1 to 40 parts by weight. A detailed description of the active material applied to the positive electrode is as mentioned above.

The positive electrode has a structure in which a positive electrode mixture layer is stacked on one or both sides of a positive electrode current collector. In one example, the positive electrode mixture layer includes a conductive material and a binder polymer in addition to the positive electrode active material, and if necessary, may further include a positive electrode additive commonly used in the art.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof.

In one example, the negative electrode includes: a current collector layer; and a negative electrode mixture layer formed on one or both surfaces of the current collector layer and including a negative electrode active material, and the negative electrode active material includes a silicon (Si)-based active material.

The silicon-based active material includes one or more selected from the group consisting of silicon (Si), silicon oxide (SiOx, $0<x<2$), and a silicon-metal (M) alloy (here, the metal (M) includes at least one of Cr and Ti). For example, the active material containing a silicon component is at least one of silicon (Si) and silicon oxide (SiOx, $0<x<2$).

In the present invention, a silicon-based active material may be applied as an active material applied to the negative electrode mixture layer, and in some cases, a carbon-based active material and a silicon-based active material may be mixed. When a carbon-based active material and a silicon-based active material are mixed and used, the mixture layer may be formed as a single layer or may be formed by dividing into two or more layers.

In one example, the negative electrode includes: a current collector layer; and a negative electrode mixture layer formed on one or both surfaces of the current collector layer and including a negative electrode active material, and the negative electrode active material includes a carbon-based active material and a silicon-based active material.

As the carbon-based active material, low crystalline carbon and/or high crystalline carbon may be used. Representative examples of low crystalline carbon include soft carbon and hard carbon are typical. Representative examples of high crystalline carbon include natural graphite, Kish graphite, pyrolytic carbon, mesophase pitch based carbon fiber, mesocarbon microbeads, mesophase pitches, and high-temperature calcined carbons such as petroleum or coal tar pitch derived cokes. For example, the carbon-based active material is a commonly used graphite component.

In another embodiment, in the negative electrode active material, the content ratio of the carbon-based active material and the silicon-based active material is in the range of 10 to 95:5 to 90 by weight. Specifically, the content ratio of the carbon-based active material and the silicon-based active material is in the range of 20 to 95:5 to 80 weight ratio, 30 to 80:20 to 70 weight ratio, 50 to 80:20 to 50 weight ratio, 70 to 80:20 to 30 weight ratio, 10 to 80:20 to 90 weight ratio, 10 to 50:50 to 90 weight ratio, 10 to 30:70 to 90 weight ratio, 30 to 60:40 to 70 weight ratio, 40 to 50:50 to 60 weight ratio or 40 to 60:40 to 60 weight ratio. Compared to the carbon-based active material, the silicon-based active material has the advantage of increasing the capacity of the battery. However, the silicon-based active material causes a large change in volume during charging and discharging. This volume change has a problem of accelerating the deterioration of the electrode or the deterioration of the battery life. In addition, the silicone-based active material has a limitation in that a large amount of a binder or a conductive material should be mixed to improve the life of the silicone-based component. However, in the present invention, by mixing and using a carbon-based active material, the volume change during charging and discharging can be reduced to a certain level, and the content of the binder or the conductive material can be reduced.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

The separator may be made of any porous substrate used in a lithium secondary battery, and for example, a polyolefin-based porous membrane or a nonwoven fabric may be used, but the present invention is not particularly limited thereto. Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

According to an embodiment of the present invention, the electrolyte may be a non-aqueous electrolyte. Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc. However, it is not particularly limited thereto, and a number of electrolyte components commonly used in the field of lithium secondary batteries may be added or subtracted within an appropriate range.

In addition, the present invention includes a device including the secondary battery described above. In a specific example, the device is at least one of a mobile device, a wearable device, a laptop computer, and an automobile. For example, the vehicle is a hybrid or electric vehicle.

Hereinafter, the present invention will be described in more detail through examples. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

EXAMPLES AND COMPARATIVE EXAMPLES

Example 1

As a positive electrode active material, 70 parts by weight of LNO ($Li_2NiO_2$) and 30 parts by weight of NCM ($LiNi_{0.8}Co_{0.1}Mn_{0.1}O_2$) were mixed. In addition, 1.5 parts by weight of carbon black (FX35, Denka, spherical, average diameter (D50) 15 to 40 nm) as a conductive material and 3.5 parts by weight of polyvinylidene fluoride (KF9700, Kureha) as a binder polymer were added to NMP (N-methyl-2-pyrrolidone) as solvent to thereby prepare a slurry for the lower mixture layer. The positive electrode active material has an average particle diameter of 6 μm.

As a positive electrode active material, 5 parts by weight of LNO ($Li_2NiO_2$) and 95 parts by weight of NCM ($LiNi_{0.8}Co_{0.1}Mn_{0.1}O_2$) were mixed. 0.1 parts by weight of carbon black (FX35, Denka, spherical, average diameter (D50) 15 to 40 nm) as a conductive material and 2 parts by weight of KF9700 (Kureha) as a binder polymer were added to NMP (N-methyl-2-pyrrolidone) as a solvent, to thereby prepare a slurry for an upper mixture layer. The positive electrode active material has an average particle diameter of 15 μm.

The slurry for the lower mixture layer was coated on the aluminum foil, and the slurry for the upper mixture layer was further coated thereon. Then, vacuum drying was performed to obtain a positive electrode. The average thickness of the lower mixture layer after drying is 15 μm, and the average thickness of the upper mixture layer is 85 μm.

In the negative electrode, as a negative electrode active material, 50 parts by weight of Si(O) and 50 parts by weight of artificial graphite (GT, Zichen(China)) were mixed. As a conductive material, 1.1 parts by weight of carbon black (Super-P), 2.2 parts by weight of styrene-butadiene rubber, and 0.7 parts by weight of carboxy methyl cellulose were added to water as a solvent to prepare a negative electrode active material slurry, followed by coating, drying and pressing the slurry on a copper current collector.

On the other hand, polypropylene was uniaxially stretched using a dry method to prepare a separator having a microporous structure having a melting point of 165° C. and a width of 200 mm on one side. An electrode assembly was prepared by repeatedly collecting unit cells having a structure in which a separator was interposed between the positive electrode and the negative electrode. After the electrode assembly was built into a pouch-type battery case, a 1M $LiPF_6$ carbonate-based solution electrolyte was injected to complete a battery.

FIG. 1 is a schematic diagram showing a cross-sectional structure of a positive electrode for a secondary battery manufactured according to the present embodiment. Referring to FIG. 1, the positive electrode 100 for a secondary battery has a structure in which a lower mixture layer 120 and an upper mixture layer 130 are sequentially stacked on an aluminum current collector 110. The lower mixture layer 120 has a structure including small active material particles 121 and 122 having a relatively small particle diameter. The active material small particles have a structure in which the first active material small particles 121 that are LNO ($Li_2NiO_2$) components and the second active material small particles 122 that are NCM ($LiNi_{0.8}Co_{0.1}Mn_{0.1}O_2$) components are mixed in a weight ratio of 70:30. The upper mixture layer 130 has a structure including active material large particles 131 and 132 having a relatively large particle diameter. The active material large particle has a structure in which a first active material large particle 131, which is an LNO ($Li_2NiO_2$) component, and a second active material large particle 132, which is an NCM ($LiNi_{0.8}Co_{0.1}Mn_{0.1}O_2$) component, are mixed in a weight ratio of 5:95.

Examples 2 to 6

A secondary battery was manufactured in the same manner as in Example 1, except that the content of the active material for each mixture layer used in manufacturing the positive electrode was different. The types and contents of the ingredients included in the positive electrode mixture layer for each example are shown in Table 1 below. In Table 1 below, the first active material is LNO ($Li_2NiO_2$), and the second active material is NCM ($LiNi_{0.8}Co_{0.1}Mn_{0.1}O_2$).

TABLE 1

| Division | | Example 1 | Example 2 | Example 3 | Example 4 | Example 5 | Example 6 |
|---|---|---|---|---|---|---|---|
| Upper mixture layer | First active material | 5 parts by weight | 8 parts by weight | 10 parts by weight | 15 parts by weight | 10 parts by weight | 5 parts by weight |
| | Second active material | 95 parts by weight | 92 parts by weight | 90 parts by weight | 85 parts by weight | 90 parts by weight | 95 parts by weight |
| Lower mixture layer | First active material | 70 parts by weight | 80 parts by weight | 80 parts by weight | 90 parts by weight | 70 parts by weight | 90 parts by weight |
| | Second active material | 30 parts by weight | 20 parts by weight | 20 parts by weight | 10 parts by weight | 30 parts by weight | 10 parts by weight |
| LNO fraction (top/bottom) | | 0.07 | 0.10 | 0.13 | 0.17 | 0.14 | 0.06 |

Comparative Example 1

100 parts by weight of NCM ($LiNi_{0.8}Co_{0.1}Mn_{0.1}O_2$) as a positive electrode active material, 1.5 parts by weight of carbon black (FX35, Denka, spherical, average diameter (D50) 15 to 40 nm) as a conductive material, and 3 parts by weight of polyvinylidene fluoride (KF9700, Kureha) as a binder polymer were added to NMP (N-methyl-2-pyrrolidone) as a solvent to prepare a slurry for the mixture layer.

The prepared slurry for the mixture layer was coated on an aluminum foil and dried under vacuum to obtain a positive electrode. The thickness of the mixture layer after drying is an average of 100 μm.

Using the prepared positive electrode, a secondary battery was manufactured in the same manner as in Example 1.

Comparative Example 2

100 parts by weight of LNO ($Li_2NiO_2$) was used as a positive electrode active material. In addition, 1.5 parts by weight of carbon black (FX35, Denka, spherical, average diameter (D50) 15 to 40 nm) as a conductive material and 3.5 parts by weight of polyvinylidene fluoride (KF9700, Kureha) as a binder polymer were added to NMP (N-methyl-2-pyrrolidone) as solvent to thereby prepare a slurry for the lower mixture layer.

100 parts by weight of NCM ($LiNi_{0.8}Co_{0.1}Mn_{0.1}O_2$) was mixed as a positive electrode active material. 0.1 parts by weight of carbon black (FX35, Denka, spherical, average diameter (D50) 15 to 40 nm) as a conductive material and 2 parts by weight of KF9700 (Kureha) as a binder polymer were added to NMP (N-methyl-2-pyrrolidone) as a solvent, to thereby prepare a slurry for an upper mixture layer.

The slurry for the lower mixture layer was coated on the aluminum foil, and the slurry for the upper mixture layer was further coated thereon. Then, vacuum drying was performed to obtain a positive electrode. The average thickness of the lower mixture layer after drying is 20 μm, and the average thickness of the upper mixture layer is 80 μm.

Using the prepared positive electrode, a secondary battery was manufactured in the same manner as in Example 1.

Comparative Examples 3 and 4

A secondary battery was manufactured in the same manner as in Example 1, except that the content of the active material for each mixture layer used in manufacturing the positive electrode was different. The types and contents of the ingredients included in the positive electrode mixture layer for each example are shown in Table 1 below. In Table 2 below, the first active material is LNO ($Li_2NiO_2$), and the second active material is NCM ($LiNi_{0.8}Co_{0.1}Mn_{0.1}O_2$).

TABLE 2

| Division | | Comparative Example 3 | Comparative Example 4 |
|---|---|---|---|
| Upper mixture layer | First active material | 0 parts by weight | 50 parts by weight |
| | Second active material | 100 parts by weight | 50 parts by weight |
| Lower mixture layer | First active material | 70 parts by weight | 90 parts by weight |
| | Second active material | 30 parts by weight | 10 parts by weight |
| LNO fraction (top/bottom) | | 0 | 0.56 |

Experimental Example 1

Evaluation of Capacity Retention Rate

For the secondary batteries prepared in Examples 1 to 6 and Comparative Examples 1 to 4, the capacity retention rate according to the charge/discharge cycle was evaluated. The capacity retention rate was evaluated by a relative value at the time point when charging and discharging were repeated 500 times.

TABLE 3

| Secondary battery | Example 1 | Example 2 | Example 3 | Example 4 | Example 5 |
|---|---|---|---|---|---|
| Capacity retention rate (%) | 100 | 99 | 98 | 97 | 99 |

| Secondary battery | Example 6 | Comparative Example 1 | Comparative Example 2 | Comparative Example 3 | Comparative Example 4 |
|---|---|---|---|---|---|
| Capacity retention rate (%) | 99 | 70 | 85 | 81 | 88 |

As a result of the evaluation, it was found that the capacity retention rate of the secondary battery according to Example 1 was 100%, and Examples 2 to 6 were also found to have a high capacity retention rate of 97% or more. On the other hand, the capacity retention rate of the secondary battery of Comparative Example 1 was 70%, the capacity retention rate of Comparative Example 2 was 85%, the capacity retention rate of Comparative Example 3 was 81%, and the capacity retention rate of Comparative Example 4 was 88%, all of which were lower than those of Examples 1 to 6.

From the above results, it can be seen that the secondary batteries according to Examples 1 to 6 can maintain constant high capacity characteristics even during repeated charging and discharging.

In particular, it can be seen that the secondary battery according to Comparative Example 1, which has a conventional positive electrode structure compared to Example 1, has a capacity retention rate which is 30% lower during 500 charging and discharging times. In addition, in the case of Comparative Examples 2 and 3 in which LNO was applied only to the lower mixture layer of the positive electrode, the capacity retention rate was better than that of Comparative Example 1, but it was confirmed that the value was 15% or more lower than that of Example 1. On the other hand, it was confirmed that Comparative Example 4 in which 50% by weight of the LNO content was included in the upper mixture layer was rather deteriorated in capacity retention performance.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

DESCRIPTION OF REFERENCE NUMERALS

100: positive electrode
110: current collector
120: lower mixture layer
130: upper mixture layer
121: first active material small particle
122: second active material small particle
131: first active material large particle
132: second active material large particle

The invention claimed is:

1. A positive electrode for a secondary battery, comprising:

a current collector layer;

a lower mixture layer disposed on one or both surfaces of the current collector layer; and an upper mixture layer directly disposed on the lower mixture layer, wherein the lower mixture layer and the upper mixture layer both include an active material consisting of a first active material and a second active material, wherein based on 100 parts by weight of the active material contained in the lower mixture layer, a content of the LNO in the lower mixture is 60 parts by weight or more, and wherein based on a total 100 parts by weight of the active material contained in the upper mixture layer, a content of the LNO in the upper mixture layer is in a range of 1 to 40 parts by weight, wherein the first active material is $Li_xNiO_2$, wherein $1.1 \leq x \leq 2.5$ (LNO), wherein, the second active material is one or more selected from the group consisting of $Li_x(Ni_aCo_bMn_c)O_2$($0.5<x<1.3$, $0<a<1$, $0<b<1$, $0<c<1$, $a+b+c=1$), $Li_xNi_{1-y}Co_yO_2$($0.5<x<1.3$, $0<y<1$), $Li_xCo_{1-y}Mn_yO_2$ ($0.5<x<1.3$, $0 \leq y<1$), $Li_xNi_{1-y}Mn_yO_2$($0.5<x<1.3$, $0 \leq y<1$), $Li_x(Ni_aCo_bMn_c)O_4$($0.5<x<1.3$, $0<a<2$, $0<b<2$, $0<c<2$, $a+b+c=2$), $Li_xMn_{2-z}Ni_zO_4$($0.5<x<1.3$, $0<z<2$), $Li_xMn_{2-z}Co_zO_4$($0.5<x<1.3$, $0<z<2$), $Li_xCoPO_4$ ($0.5<x<1.3$) and $Li_xFePO_4$($0.5<x<1.3$), and compounds of the active material in the upper mixture layer and the lower mixture layer are the same.

2. The positive electrode of claim 1, wherein a ratio $((L_{TOP})/(L_{UND}))$ of an LNO fraction ($L_{TOP}$, wt %) of the active material contained in the upper mixture layer to an LNO fraction ($L_{UND}$, wt %) of the active material contained in the lower mixture layer is 0.5 or less.

3. The positive electrode of claim 1, wherein the active material includes a first active material and a second active material, wherein a weight ratio of the first active material to the second active material in the lower mixture layer is in a range of 65 to 98:2 to 35, and wherein a weight ratio of the first active material to the second active material in the upper mixture layer is 2 to 35:65 to 98.

4. The positive electrode of claim 1, wherein an average particle diameter of the active materials contained in the lower mixture layer is in a range of 1 to 10 μm, and wherein an average particle diameter of the active materials contained in the upper mixture layer is in a range of 15 to 60 μm.

5. The positive electrode of claim 1, wherein a ratio of an average thickness of the lower mixture layer to the upper mixture layer is in a range of 1:9 to 3:7.

6. The positive electrode of claim 1, wherein the upper mixture layer and the lower mixture layer both include a binder, and wherein a ratio $((B_{TOP})/(B_{UND}))$ of a binder content ($B_{TOP}$, wt %) contained in the upper mixture layer to a binder content ($B_{UND}$, wt %)) contained in the lower mixture layer is in a range of 0.1 to 0.95.

7. A secondary battery comprising the positive electrode according to claim 1, a negative electrode, and a separator interposed between the positive electrode and the negative electrode.

8. The secondary battery of claim 7, wherein the negative electrode includes:

a current collector layer; and a negative electrode mixture layer formed on one or both surfaces of the current collector layer and including a negative electrode active material, wherein the negative electrode active material includes a silicon (Si)-based active material.

9. The secondary battery of claim 7, wherein the negative electrode includes:

a current collector layer; and a negative electrode mixture layer formed on one or both surfaces of the current collector layer and including a negative electrode active material, wherein the negative electrode active material includes a carbon-based active material and a silicon-based active material.

10. The secondary battery of claim 9, wherein in the negative electrode active material, a weight ratio of the carbon-based active material to the silicon-based active material is in a range of 10 to 95:5 to 90.

11. A device comprising the secondary battery according to claim 7.

12. The device of claim 11, wherein the device is at least one of a mobile device, a wearable device, a laptop computer, or a car.

13. The positive electrode of claim 1, wherein, the second active material comprises $Li_x(Ni_aCo_bMn_c)O_2$(0.5<x<1.3, 0<a<1, 0<b<1, 0<c<1, a+b+c=1).

14. The positive electrode of claim 1, wherein, the second active material comprises $Li_xNi_{1-y}Co_yO_2$(0.5<x<1.3, 0<y<1).

15. The positive electrode of claim 1, wherein, the second active material comprises $Li_xCo_{1-y}Mn_yO_2$(0.5<x<1.3, 0≤y<1).

16. The positive electrode of claim 1, wherein, the second active material comprises $Li_xNi_{1-y}Mn_yO_2$(0.5<x<1.3, 0≤y<1).

17. The positive electrode of claim 1, wherein, the second active material comprises $Li_x(Ni_aCO_bMn_c)O_4$(0.5<x<1.3, 0<a<2, 0<b<2,0<c<2, a+b+c=2).

18. The positive electrode of claim 1, wherein, the second active material comprises $Li_xMn_{2-z}Ni_zO_4$(0.5<x<1.3, 0<z<2).

19. The positive electrode of claim 1, wherein, the second active material comprises $Li_xMn_{2-z}CO_zO_4$(0.5<x<1.3, 0<z<2).

20. The positive electrode of claim 1, wherein, the second active material comprises $Li_xCoPO_4$(0.5<x<1.3).

* * * * *